Figure 1:
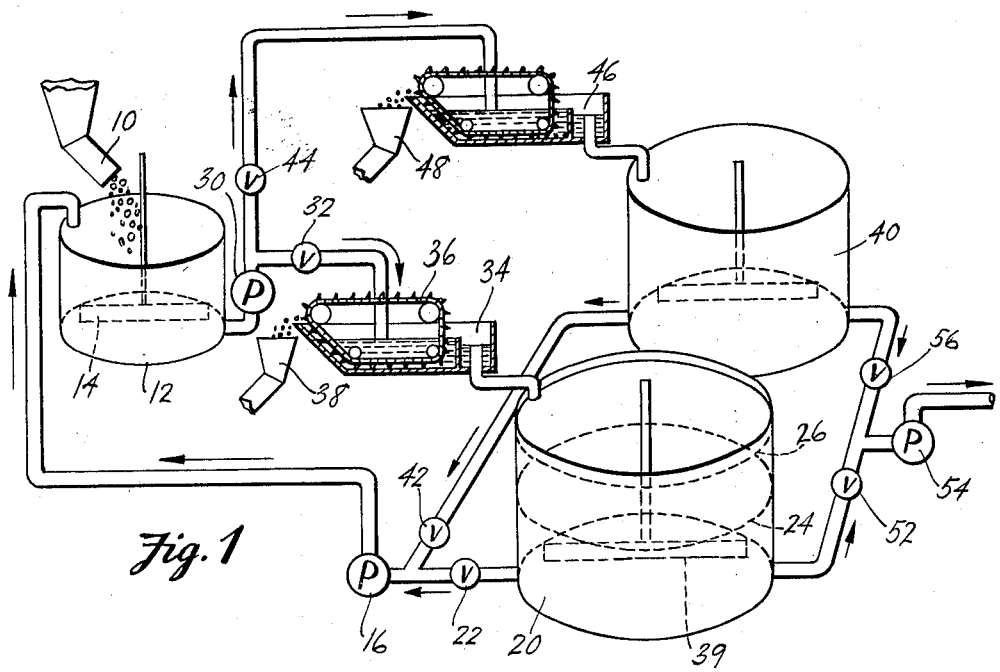

Dec. 8, 1959   S. C. LYONS   2,916,214
METHOD OF BLUNGING CLAY
Filed July 10, 1957

INVENTOR
Sanford C. Lyons
by Morse & Altman
ATT'YS

United States Patent Office 2,916,214
Patented Dec. 8, 1959

2,916,214

METHOD OF BLUNGING CLAY

Sanford C. Lyons, Bennington, Vt., assignor to Georgia Kaolin Company, Elizabeth, N.J., a corporation of New Jersey Application July 10, 1957, Serial No. 671,100

8 Claims. (Cl. 241—16)

This invention relates to a method of blunging clay. When clay is mined for industrial purposes, it is obtained usually in chunks containing usually about 25% moisture. These chunks must be disintegrated in water to form a fluent slip or slurry so that the clay can be further processed, for example, by purifying and classifying according to particle size. As well understood by those skilled in the art, a slip of optimum composition is one having sufficient water content to permit the efficient removal of sand, mica, and the like by settling, but having no more water than is necessary for this purpose. In blunging clay it is usually desirable to employ as little water as possible since the refined clay is customarily dried for shipment and the removal of water is expensive. Hence, deflocculating reagents are employed to promote fluency of the slip with a minimum amount of water, such reagents usually being added during the blunging operation. The present practice in blunging is a continuous operation in which a stream of water is added to a stream of lumps of clay with sufficient agitation to reduce most of the clay to a slurry, a suitable reagent such as tetra sodium pyrophosphate or sodium silicate being added during the operation. The addition of the correct amounts of reagent is exceedingly difficult as the natural viscosity of crude clay which is being supplied will usually vary continually so that the optimum amounts of reagent to be supplied will likewise vary continually. Delicate testing instruments are employed in the effluent stream of slurry, but as those instruments can detect only what has been done and cannot predict how much reagent will be needed for the incoming lumps of crude clay, automatic regulating mechanism for supplying the reagent must be set to supply a slight excess, since if the rate of supply falls below the optimum, a sharp and efficient particle-size fraction cannot be achieved. On the other hand, even a small over-dosage is highly objectionable from the standpoint of product quality since any of the reagent which is present in excess of requirement reacts with chemicals which are later used for bleaching and reflocculation and thereby produces reaction products which are known to cause small agglomerations of clay particles. These agglomerates persist and are apt to result in defective end products when used, for example, for coating paper.

According to the present invention, use of the usual costly and inaccurate control mechanisms for regulating the addition of deflocculating reagents is avoided, accuracy of dosage is obtained, and a great saving of time and power costs is had. First, a convenient amount of crude clay, say, 200 tons, is decided upon as the size of the batch to be blunged. By my method, it is unnecessary that this clay ever be actually weighed or fed into the production stream at a predetermined rate. In fact, crude kaolin of this sort is very difficult to feed at a uniform rate because of the irregular shape and size of the lumps and, more particularly during wet weather, it becomes so sticky as to defy all efforts to control its introduction to the production stream at any predetermined rate with any degree of accuracy. Instead of attempting to measure an amount of crude clay for a batch, or to feed it to the blunger at some uniform rate, as is attempted in conventional blunging systems, I prepare a receiving tank of such dimensions that it will easily hold 200 tons (dry basis) of clay when in slurry form of the desired concentration, say 40% solids. Into this tank is measured the quantities of water and deflocculating reagent needed to produce a slip of the desired solids concentration as calculated, allowance being made for the natural moisture content of the crude clay. In normal commercial practice, crude kaolins in central Georgia will require about 2 lbs. of tetra sodium pyrophosphate or other so-called alkali-metal polymetaphosphate per ton of crude clay, or about 3 lbs. of sodium silicate per ton of clay. The calculated amounts of water and reagent are put in a tank or other suitable container and are progressively pumped from the tank into a blunger into which a stream of lumps of crude clay is fed, the water and reagent being initially in considerable excess. The blunged effluent from the blunger is pumped back into the tank to mix with the supply of water and reagent therein, the resultant thin slurry being recirculated to the blunger to mix with the incoming clay. The slip thus becomes progressively thicker until the predetermined amount of clay as indicated by the consistency of the slip and the depth of the pool of the slip in the tank has been fed into the blunger. Since the consistency of the slip formed in the blunger, except in the final stages of a blunging operation, is much thinner than the ultimate slip, most of the blunging operation is performed rapidly and with a low consumption of power. Measurement of the solids content of the slip in the primary makedown tank can be determined almost instantly by means of a hydrometer. Also reference to a table calibrated in terms of tons of clay per foot of slurry depth (at any selected solids content) will very rapidly and conveniently show when the desired 200 tons of clay has been blunged and pumped into the tank. As the required quantity of deflocculating reagent can be closely calculated for a given batch of crude clay, over-dosage is avoided.

When the entire batch of clay has been blunged, another batch is operated on. To save time, a second tank may be provided to receive the water and chemical required for the next batch of crude clay. The water and chemical can be measured while the first blunging operation is in progress so that at its conclusion the operation on the second batch can be started at once.

Ordinarily, when crude clay is run through a blunger, the effluent slip contains not only whatever grit and other impurities may have been present in the crude clay, but also small lumps of clay which have not disintegrated. These impurities and lumps are removed from the slip by suitable apparatus and are fed to another blunger which reduces the small lumps to a slip from which the impurities are easily separated. I have found that, contrary to expectations, the clay in the small lumps remaining after the first blunging has a lower than average viscosity. This residual clay is thus especially suitable for paper-coating and other uses requiring a low-viscosity clay. Hence instead of returning the slip resulting from the separate blunging operation to the main tank, this slip can be kept separate for further treatment.

Apparatus for practicing the invention is hereinafter described and is illustrated on the drawing of which—

Figure 2:
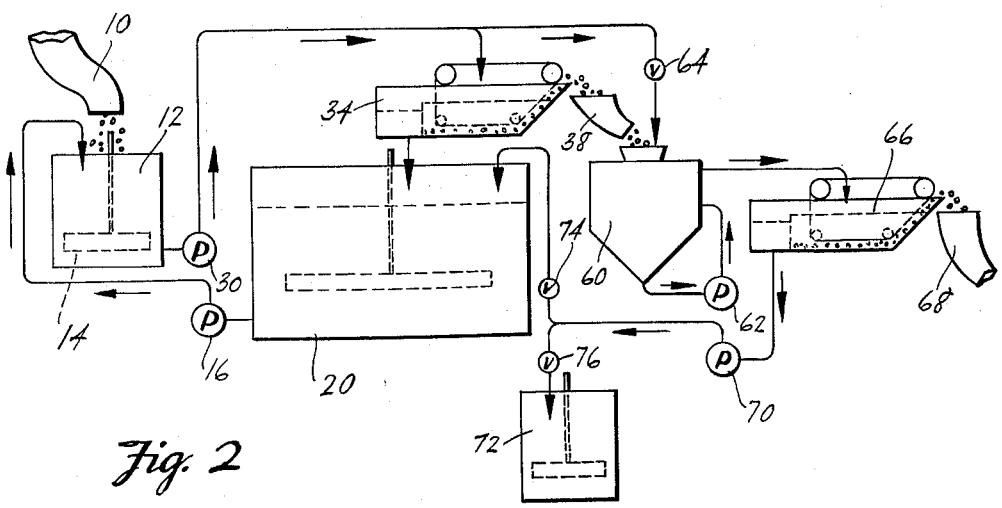

Figure 1 is a diagrammatic showing of apparatus for blunging successive batches of crude clay; and Figure 2 is a diagrammatic showing of apparatus for primary and secondary blunging.

Chunks of crude clay are fed in a more or less continuous stream by means of a suitable digging apparatus (not shown) directly from the pit face or from a stockpile, through a chute or spout 10 into a suitable blunger 12 which, as shown, may be a simple tank with a stirring paddle 14 therein. At the same time a stream of water in which a measured amount of a deflocculating reagent is dissolved is pumped into the blunger by a pump 16 from a tank 20, a valve 22 in the pipe line between the tank 20 and pump 16 being open.

Prior to the beginning of the operation suitable calculations are made as to the quantity of clay to be blunged, and the corresponding quantities of water and reagent required. The water is measured into the tank 20 and may extend up to a mark 24, the quantities being chosen so that the final pool of clay slip will nearly fill the tank, with a level at 26. The calculated amount of deflocculating reagent is thrown into the tank to dissolve in the pool.

The clay slip from the blunger is pumped by a pump 30 through an open valve 32 to a drag classifier 34 where the lumps, grit and other heavier matter settle out and are dragged out from the bottom of the vessel by an endless belt 36 with paddles and discharged into a hopper 38 for further treatment or discard. The slip flows from the classifier 34 back to the tank 20 to mix with the pool therein and to be recirculated to the blunger 12. A suitable agitator 39 is revolved in the tank 20 to stir the slip and prevent settling.

To save time or increase production by keeping the blunger operating continuously, a second tank 40 is provided which receives water and chemicals so as to be ready to start with a second batch of crude clay as soon as the first batch has been blunged. When the second batch of clay begins to flow through the spout 10 into the blunger 12, the valves 22 and 32 are closed and a valve 42 in the pipe leading from the tank 40 to the pump 16 is opened as is also a valve 44 in the pipe leading from the pump 30 to a second drag classifier 46 which separates the heavy lumps and particles from the slip and discharges them into a hopper 48, the slip flowing into the tank 40 to mix in the pool therein and be recirculated to the blunger 12.

After a batch of clay has been blunged with water and chemical from the tank 20, the valve 22 is closed and the slip is drained from the tank through an opened valve 52 using a pump 54 if necessary. The valve 52 is then closed and the tank 20 is again charged with water and chemical for another operation. Meanwhile, when tank 40 has become filled with slip from a batch of blunged clay, the valve 42 is closed, a discharge valve 56 is opened, and the tank is emptied by the pump 54.

Figure 2 of the drawing is a flow diagram of one of the blunging circuits shown in Figure 1, together with additional apparatus, the second circuit shown in Figure 1 being omitted in Figure 2 to avoid confusion. As hereinbefore described, water or slip is circulated from the tank 20 to the blunger 12 and back to the tank 20, the effluent from the blunger being passed through a drag classifier to remove unblunged lumps, grit, etc. from the stream before it is returned to the tank 20. Figure 2 shows additional apparatus for treating the matter thus removed from the streams by the drag classifier. The spout 38 discharges into a secondary blunger 60 of any suitable type, a pump 62 being provided for local recirculation of the slip in this blunger. Enough of the slip from the blunger 12 is diverted through a control valve 64 into the secondary blunger 60 to provide the liquid and chemical necessary for the blunging of the clay lumps supplied by the classifier 34.

The effluent slip from the secondary blunger 60 may be delivered to another drag classifier 66 wherein the grit and other heavy impurities will settle out and be discharged through a hopper 68 to waste. The slip from the classifier 66 is pumped by a pump 70 either back to the tank 20 or to a separate receiving tank 72, the delivery to these tanks being controlled by suitable valves 74 and 76.

Similar additional apparatus can be used with the tank 40 and the classifier 46.

I claim:

1. A batch method of blunging crude clay, which comprises measuring into a separate container the quantity of water necessary to produce with a predetermined but not physically demarcated quantity of clay a slip of predetermined concentration, progressively feeding crude clay into a blunger, conveying the water in a stream from the container to the blunger to form slip, circulating and recirculating the slip between the container and blunger, and ceasing circulation to the blunger when the slip in the container acquires said predetermined concentration.

2. A batch method of blunging crude clay, which comprises measuring into a separate container the quantity of water and a chemical agent necessary to produce with a predetermined but not physically demarcated quantity of clay a slip of predetermined concentration, progressively feeding crude clay into a blunger, conveying the water and agent in a stream from the container to the blunger to form slip, circulating and recirculating the slip between the container and blunger, and ceasing circulation to the blunger when the slip in the container acquires said predetermined concentration.

3. A batch method of blunging crude clay, which comprises measuring into a separate container the quantities of water and deflocculating agent necessary to produce with a predetermined but not physically demarcated quantity of clay a slip of optimum composition, progressively feeding crude clay into a blunger, conveying said water and agent in a stream from the container to the blunger to form slip, circulating and recirculating the slip between the container and blunger, and ceasing circulation to the blunger when the slip in the container acquires said optimum composition.

4. A batch method of blunging crude clay, which comprises measuring into a separate container the quantity of water necessary to produce with a predetermined but not physically demarcated quantity of clay a slip of predetermined concentration, progressively feeding crude clay into a blunger, conveying said water in a stream to the blunger to form slip, circulating and recirculating the slip between the container and blunger, ceasing circulation to the blunger when the slip in the container acquires said predetermined concentration, and removing from said slip circulating from the blunger to the container foreign particles and lumps of clay which have not been disintegrated in the blunger.

5. A batch method of blunging crude clay, which comprises measuring into a separate container the quantities of water and deflocculating agent necessary to produce with a predetermined but not physically demarcated quantity of clay a slip of optimum composition, progressively feeding crude clay into a blunger, conveying said water and agent in a stream to the blunger to form slip, circulating and recirculating said slip between said container and blunger until the slip in the container has acquired said optimum composition as determined by the solids concentration therein, and removing from said slip circulating from the blunger to the container foreign particles and lumps of clay which have not been disintegrated in the blunger.

6. An effectively continuous method of blunging crude clay to form slip of optimum composition without excess deflocculating agent, which comprises measuring into a separate container the quantities of water and a deflocculating agent necessary to produce with a predetermined but not physically demarcated quantity of clay a slip of optimum composition, progressively feeding crude clay into a blunger, conveying said water and agent in a stream to the blunger to form slip, circulating and recirculating the slip between the container and blunger until the slip in the container becomes of optimum composition as determined by its solids' concentration, measuring into a second container the quantities of water and deflocculating agent necessary to produce with a predetermined but not physically demarcated quantity of clay a slip of optimum composition, disconnecting the first container from the blunger and connecting the second container to the blunger when the slip in the first container has become of optimum composition, conveying the water and agent from the second container in a stream to the blunger to form slip, circulating and recirculating the last-named slip between the second container and blunger while drawing off the slip from the first container and measuring a new charge of water and deflocculating agent into the first container, then disconnecting the second container from the blunger when the slip in the second container has become of optimum composition and connecting the first container to the blunger for circulation of the new charge of water and agent, and repeating the foregoing cycle by alternate connections of the two containers with the blunger for blunging successive batches of crude clay.

7. The method described in claim 6, including in addition a step of removing from the slip flowing from the blunger to either of said containers foreign particles and lumps of clay which have not been disintegrated in the blunger.

8. The method described in claim 7, plus the step of separately blunging the lumps of clay recovered from the stream flowing from the blunger.

References Cited in the file of this patent

UNITED STATES PATENTS

| | | |
|---|---|---|
| 2,164,052 | Bullwinker | June 27, 1939 |
| 2,520,320 | Lyons et al. | Aug. 29, 1950 |
| 2,789,772 | Williamson | Apr. 23, 1957 |